Nov. 29, 1955     I. B. RACHMAN ET AL     2,725,153
HAND TRUCK
Filed Nov. 2, 1954
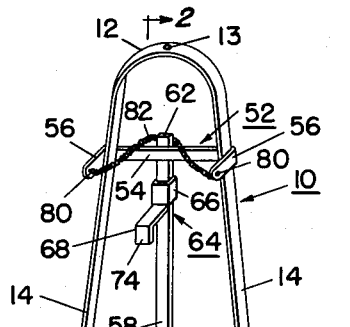
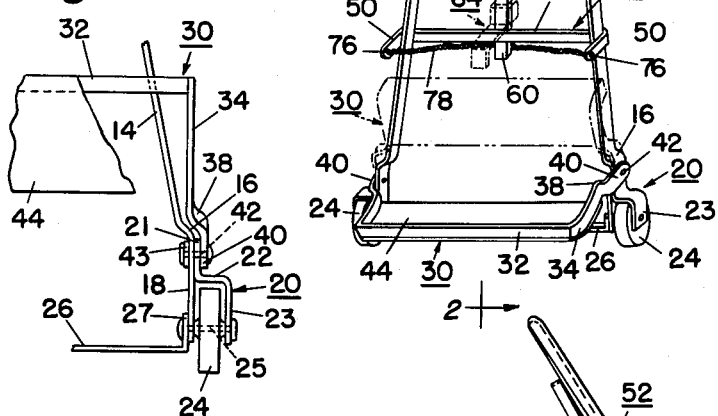
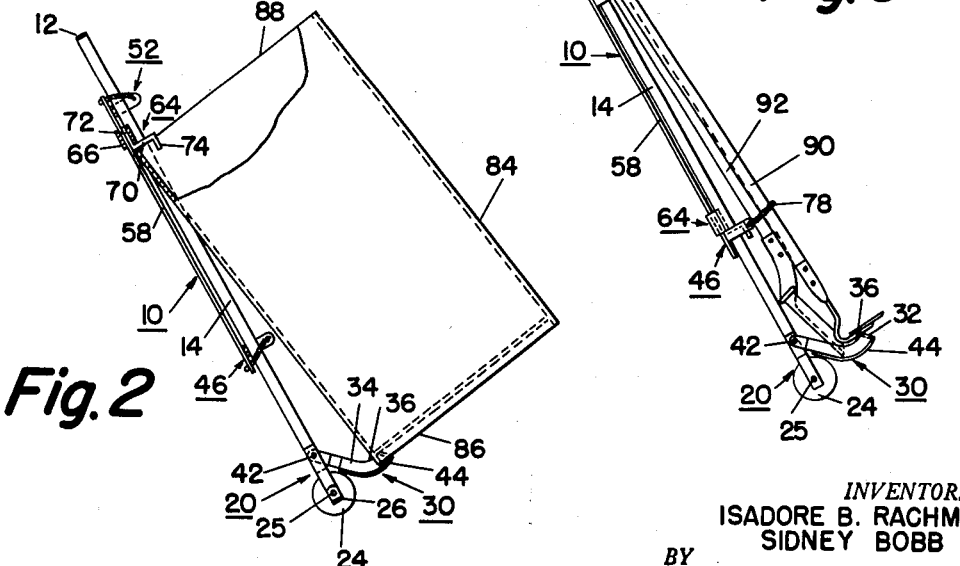
*INVENTORS*
ISADORE B. RACHMAN
SIDNEY BOBB
BY
*Arthur N. Klein*
ATTORNEY

United States Patent Office 2,725,153
Patented Nov. 29, 1955

2,725,153
HAND TRUCK

Isadore B. Rachman and Sidney Bobb, Philadelphia, Pa., assignors to P. B. R. Manufacturing Co., Philadelphia, Pa., a partnership Application November 2, 1954, Serial No. 466,342

2 Claims. (Cl. 214—383)

The present invention relates generally to hand trucks and more particularly hand trucks of the type intended for use around the home for transporting trash cans, gardening tools, etc.

An object of the present invention is to provide a new and useful construction for a two-wheel hand truck or the like. Another object of this invention is to provide a novel hand truck which is extremely simple and inexpensive to produce, light in weight, and yet capable of transporting relatively heavy loads in secure fashion.

Other objects and advantages of the present invention are apparent in the following detailed description, appended claims and accompanying drawings.

For the purpose of illustrating this invention, one form thereof, which is presently preferred, is shown in the accompanying drawings; it being understood, however, that the invention is not limited to the precise arrangements and instrumentalities illustrated.

In the accompanying drawings, wherein like reference characters indicate like parts throughout:

Figure 1 is a perspective view of a two-wheel hand truck embodying this invention.

Figure 2 is a vertical cross-sectional view of the embodiment of Fig. 1, as it appears in use, in transporting a trash can.

Figure 3 is a side elevational view of the embodiment of Fig. 1, but showing the hand truck as it appears when used in transporting long-shafted gardening tools.

Figure 4 is an enlarged fragmentary front elevational view, with parts broken away, showing the wheel mounting of the embodiment of Fig. 1.

In Fig. 1, there is shown a hand truck embodying the present invention and including a generally upright integral frame 10, integrally formed from a length of thin flat metal stock; preferably aluminum alloy or other light weight metal.

The frame 10 is of inverted generally V-shaped configuration with an uppermost rounded handle portion 12 and downwardly diverging sides 14. At the lower ends of the sides 14, the frame 10 is bent outwardly as at 16, and is then bent downwardly to provide generally vertical portions 18.

Mounted at the lowermost vertical portion 18 of each frame side is a wheel retaining member 20 having an uppermost generally vertical portion 21, an intermediate outwardly-extending portion 22, and a vertical lowermost portion 23 extending generally upwardly to, but spaced somewhat outwardly of, the vertical frame portion 18.

Disposed intermediate the vertical portions 18 and 23, at each side of the frame, is a wheel 24 which is journaled upon a shaft or pin 25 extending through aligned holes adjacent the lowermost ends of the portions 18 and 23.

A bottom transverse brace 26 having relatively small upturned end portions 27 extends intermediate the lowermost ends of the frame portions 18. Each of the upturned end portions 27 is provided with a hole through which the wheel 25 extends. Thus, the pin 25 not only serves as a journal for the wheel, but also serves to connect the member 26 to the vertical frame portion 18, as best shown in Fig. 4.

As also shown in Fig. 4, the uppermost vertical portion 23 of the wheel retaining member 20 is fastened to the vertical frame portion 18 (slightly below the uppermost end thereof) by a pin 42 which will be more fully described hereinbelow.

The hand truck also includes a lowermost supporting member indicated generally by the reference character 30. The member 30 is preferably also formed, for the most part, from a single length of thin flat aluminum alloy or other suitable metal bent into generally U-shaped configuration and includes a generally plane front portion 32 (which extends transversely substantially the full width of the hand truck) and side portions 34. The side portions 34 extend generally at right angles from the ends of the front portion 32 and are curved so as to provide generally concave upper edges 36, best shown in Figs. 2 and 3.

The side portions 34 are bent laterally outward as at 38 to provide offset free ends 40 which are constructed and arranged to fit against the outer faces of the upper vertical portions 21 of the wheel retaining members 20. Pivot pins 42 extend through aligned holes in each free end 40 and each vertical portion 18 and 21; the pin 42 serving to secure the vertical portion 21 to the vertical frame portion 18, in addition to providing a pivot for the supporting member 30. If desired, a washer 43 can be provided at the inner end of each pivot pin 42, adjacent the inner face of the vertical frame portion 18, to make pivotation of the supporting member 30 somewhat easier.

As best shown in Fig. 4, the bent frame portion 16 provides sufficient offset to accommodate the bent part 38 of the supporting member 30 when the latter is in its raised inoperative position.

A floor plate 44 of light weight sheet metal or the like may be secured to the under side of the supporting member 30 in any suitable manner. Thus, for example, the front edge of the floor plate 44 may be welded to the lower edge of the front portion 32 while the side edges of the floor plate 44 may be welded to the convex lower edges of the side portions 34.

In the operative position shown in Figs. 2 and 3, and also shown in solid lines in Fig. 1, the supporting member 30 extends in downwardly diverging relationship to the vertical frame portion 18; the lower edges of the bent parts 38 bearing against the forward edges of the vertical frame portions 18 to maintain the member 30 in this predetermined angular relationship.

To provide greater compactness in shipping or storing, the member 30 may be swung upward about its pivot pins 42 to the position shown in Fig. 4 and also shown in dash-dot lines in Fig. 1, wherein it is disposed in generally vertical position, more or less flat against the front edges of the sides 14.

So as further to facilitate storage when not in use, a hole 13 may be provided in the handle portion 12 so that the hand truck can be hung on a hook against the wall of a storage shed, garage, or the like.

A generally horizontal reinforcing member 46 connects the diverging sides 14 of the frame 10 somewhat above the lower ends thereof. The reinforcing member 46 is preferably also formed from a length of thin flat light weight aluminum alloy or the like which is bent into generally U-shaped configuration with an elongated transversely extending portion 48 and relatively short end portions 50 which fit against the outer faces of the sides 14 and extend slightly forwardly therebeyond. The end portions 50 are welded or otherwise secured to the sides 14 to provide greater strength and rigidity.

A second reinforcing member 52 is provided adjacent the upper ends of the sides 14. The reinforcing member 52 is also preferably formed from a length of thin flat light weight aluminum alloy or the like bent into generally U-shaped configuration with an elongated transverse portion 54 and relatively short end portions 56 which fit against the sides 14 and extend forwardly slightly therebeyond; the end portions 56 being welded or otherwise suitably secured to the sides 14 in the same manner as described hereinbelow in connection with the lower reinforcing member 46.

Indeed, the lower and upper reinforcing members 46 and 52 may be substantially the same in configuration, except that the transverse portion 48 of the lower member 46 is necessarily longer than the transverse portion 54 of the upper member 52, so as to accommodate the downward divergence of the sides 14.

A plane guide member 58 extends generally vertically intermediate the lower and upper members 46 and 52, generally at center line of the frame. The guide member 58, which is also preferably formed from a straight length of thin flat light weight aluminum alloy or the like, is welded or otherwise secured to the back or under face of the transverse portions 48 and 54 (generally at the center of said portions 48 and 54). However, the guide member 58 is preferably slightly longer than the distance between the members 46 and 52 so that its ends form relatively short lower and upper extensions 60 and 62 respectively.

Slidably mounted upon the guide member 58 is an adjustable clamp indicated generally by the reference character 64. The clamp 64 includes an annular collar 66 which fits slidably around the guide member 58. The clamp also includes a tongue member 68 which has a generally horizontal forwardly directed intermediate portion 70, an upwardly-bent end portion 72 (which extends within, and is welded to, the collar 66) and a downwardly-bent free end portion 74.

The clamp 64 can be moved vertically along the guide member 58; a raised position being shown in solid lines in Fig. 1, while a lowered position is shown in dash-dot lines.

The end portions 50 of the lower reinforcing member 46 are provided with holes 76 to receive the ends of a helical spring 78 which has a normal contracted length approximately the same as that of the transverse portion 48.

The end portions 56 of the upper reinforcing member 52 are similarly provided with holes 80 to receive the ends of a somewhat shorter helical spring 82, having a normal contracted length generally the same as that of the transverse portion 54.

When the hand truck is not in use, or when it is used for transporting relatively large articles, as for example trash cans, the springs 78 and 82 are hooked behind the lower and upper extensions 60 and 62 respectively, of the guide member 58, as illustrated in Fig. 1.

The manner of using the hand truck to transport a trash can 84 is shown in Fig. 2.

Thus, the bottom rim 86 of the trash can 84 rests against the concave upper edges 36 of the supporting member 30 while the top rim 88 bears against the front edges of the frame sides 14. The clamp 64 is manually raised to uppermost position on the guide member 58 and then permitted to slide downward until its intermediate portion 70 bears against the top rim 88 with the downwardly bent end portions 74 fitting inside the rim so as to hold the trash can in place upon the hand truck. Obviously, the clamp can adjust to trash cans of different height.

The hand truck is used generally like a wheel-barrow. That is, it is pushed or pulled at an angle from the vertical so that the front edges of the frame sides 14 are generally uppermost, as illustrated in Fig. 2. This places the center of gravity of the hand truck and the load at a point intermediate the wheels and the handle portion 12, providing a mechanical advantage which makes it possible to transport relatively heavy loads with ease.

In order to remove the trash can, the truck is tilted (clockwise in Fig. 2) until the front portion of the bottom rim 86 of the can 84 contacts the ground, after which the clamp is lifted with one hand and the upper rim of the trash can is pushed forward with the other hand sufficiently to permit the bottom rim to clear the supporting member 30, whereupon the hand truck is pulled backward and free of the can.

To load the trash can onto the hand truck, a similar procedure is followed. That is, the hand truck is moved close to the can, tilted to position the front portion 32 of the supporting member 30 adjacent the ground, after which the can is pushed with one hand to raise the adjoining portion of its bottom rim off the ground. The hand truck is then pushed forward to place the supporting member 30 beneath the bottom rim, the clamp 64 is lowered to engage the top rim of the can, and the hand truck is swung (counterclockwise in Fig. 2) back to its load carrying position.

It should be noted that, when the hand truck is used for transporting a trash can, the lower rim of the can is supported entirely upon the upper concave edges 36 of the supporting member 30, no load being carried by the floor plate 44. Thus, when the hand truck is to be used solely for transporting trash cans and the like, the floor plate may be eliminated to reduce cost of manufacture. However, it is preferred to include the floor plate 44 so that the hand truck can be used for transporting other articles, as for example garden tools (hoe 90 and shovel 92) shown in Fig. 3. That is, the lower ends of the garden tools can rest against the floor plate while the shafts extend upward along frame 10.

In order to maintain the garden tools or other long handled equipment securely in place upon the hand truck, the springs 78 and 82 are now unhooked from the extensions 60 and 62 are placed over the shafts or handles so as to hold them against the frame, in the manner shown in Fig. 3.

From the foregoing description, it can be seen that the hand truck of the present invention is fabricated, almost completely, from thin flat metal strips, which can be quickly and easily formed by conventional bending and stamping operations and can be quickly assembled by welding, riveting or other conventional operations requiring no complicated machinery.

The hand truck can be fabricated to weigh only a few pounds so that it can be compactly packaged in flat cartons which are convenient for shipping and warehouse storage.

Although weighing only a few pounds, as mentioned above, the hand truck is capable of easily handling loads of as much as one hundred pounds.

The present invention may be embodied in other specific forms and, therefore, the foregoing description is to be considered in all respects merely as illustrative and not restrictive, reference being made to the appended claims as indicating the scope of this invention.

Having thus described our invention, we claim as new and desire to protect by Leters Patent the following:

1. A hand truck comprising a frame integrally formed from a length of thin flat ribbon metal or the like and having an inverted generally V-shaped configuration with an uppermost rounded handle portion and downwardly diverging sides, a transverse bottom brace member connecting the lower ends of the frame sides, a pair of wheels mounted at the lowermost ends of the frame sides, a supporting member connected to each of the two frame sides by a pivot pin or the like somewhat above the lowermost ends thereof, said supporting member being constructed and arranged to be placed either in forwardly and downwardly inclined operative position or in upwardly raised inoperative storage position, a pair of vertically spaced transverse reinforcing members connecting the frame sides, a vertical guide member mounted on said transverse members with its ends extending slightly above and below said transverse members, a vertically adjustable can-rim engaging clamp slidably mounted on said guide member intermediate said transverse members, and an elongated extensible spring connected to the two ends of each transverse reinforcing member, said springs being constructed and arranged to fit over the load and resiliently to retain it on the hand truck, the springs being hooked behind the extending ends of the guide member when not in use.

2. A hand truck comprising a frame integrally formed from a length of thin flat ribbon metal or the like and having an inverted generally V-shaped configuration with an uppermost rounded handle portion and downwardly diverging sides, a vertically adjustable can-rim engaging clamp mounted on the frame generally intermediate the frame sides, a supporting member connected to each of the two frame sides by a pivot pin or the like somewhat above the lowermost ends of the frame sides, said supporting member being constructed and arranged to be placed either in forwardly and downwardly inclined operative position wherein it supports the lower end of the load or in upwardly raised storage position wherein it lies generally flat against the frame sides, a wheel retaining member fastened at its upper end to each frame side by the supporting member pivot pin, the lower portion of the wheel retaining member being offset from the frame side and extending downward in generally parallel relationship therewith, a wheel disposed intermediate the offset portion of each retaining member and the lower end of the corresponding frame side, said wheel being journalled on a pin which extends through the wheel hub and also through aligned holes in the lowermost ends of the retaining member and the frame side, and a bottom brace member extending transversely intermediate the lowermost ends of the frame sides and having its ends fastened to the frame sides by the wheel pins which extend through aligned openings in the brace member ends.

References Cited in the file of this patent

UNITED STATES PATENTS

| | | |
|---|---|---|
| 74,107 | May | Feb. 14, 1868 |
| 483,006 | Nichless | Sept. 20, 1892 |
| 618,629 | Watts et al. | Jan. 31, 1899 |
| 620,114 | Ferrell | Feb. 28, 1899 |
| 1,465,945 | Lea | Aug. 28, 1923 |
| 2,645,370 | Black | July 14, 1953 |